United States Patent
Abramov et al.

(10) Patent No.: US 8,258,427 B2
(45) Date of Patent: Sep. 4, 2012

(54) LASER CUTTING OF GLASS ALONG A PREDETERMINED LINE

(75) Inventors: Anatoli Anatolyevich Abramov, Painted Post, NY (US); Yawei Sun, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 918 days.

(21) Appl. No.: 12/334,121

(22) Filed: Dec. 12, 2008

(65) Prior Publication Data

US 2009/0294420 A1    Dec. 3, 2009

Related U.S. Application Data

(60) Provisional application No. 61/057,549, filed on May 30, 2008.

(51) Int. Cl.
   *B23K 26/00* (2006.01)
(52) U.S. Cl. .......... 219/121.69; 219/121.72; 219/121.67
(58) Field of Classification Search ............. 219/121.69, 219/121.72, 121.67, 121.73, 121.76
   See application file for complete search history.

(56) References Cited

U.S. PATENT DOCUMENTS

| | | | | |
|---|---|---|---|---|
| 5,521,352 A | * | 5/1996 | Lawson .................... | 219/121.67 |
| 5,578,229 A | * | 11/1996 | Barnekov et al. ......... | 219/121.72 |
| 5,609,284 A | | 3/1997 | Kondratenko .................... | 225/1 |
| 5,776,220 A | | 7/1998 | Allaire et al. .................... | 65/112 |
| 5,984,159 A | | 11/1999 | Ostendarp et al. ........... | 225/93.5 |
| 6,087,625 A | * | 7/2000 | Iso .............................. | 219/121.8 |
| 6,294,757 B1 | | 9/2001 | Whittenbury ............ | 219/121.72 |
| 6,300,593 B1 | * | 10/2001 | Powell ....................... | 219/121.68 |
| 6,407,360 B1 | * | 6/2002 | Choo et al. ................ | 219/121.67 |
| 6,563,082 B2 | * | 5/2003 | Terada et al. ............. | 219/121.72 |
| 6,576,870 B2 | * | 6/2003 | Wu ........................... | 219/121.72 |
| 6,795,274 B1 | * | 9/2004 | Hsieh et al. ................... | 360/135 |
| 6,800,831 B1 | | 10/2004 | Hoetzel ..................... | 219/121.72 |
| 7,638,730 B2 | * | 12/2009 | Yoo et al. .................. | 219/121.68 |
| 7,723,212 B2 | * | 5/2010 | Yamamoto et al. ........... | 438/463 |
| 7,772,522 B2 | * | 8/2010 | Matsumoto et al. ..... | 219/121.72 |
| 7,816,623 B2 | * | 10/2010 | Otsu et al. ................ | 219/121.62 |
| 7,964,820 B2 | * | 6/2011 | Bann ........................ | 219/121.69 |
| 2002/0056891 A1 | | 5/2002 | Wu ................................ | 257/620 |
| 2005/0029321 A1 | | 2/2005 | Hauer et al. ................ | 225/93.5 |

FOREIGN PATENT DOCUMENTS

| | | |
|---|---|---|
| JP | 2003-034545 | 2/2003 |
| JP | 2006-347783 | 12/2006 |
| JP | 2008-114446 | 5/2008 |
| TW | I248920 | 2/2006 |
| WO | WO 96/20062 | 7/1996 |

* cited by examiner

*Primary Examiner* — M. Alexandra Elve
(74) *Attorney, Agent, or Firm* — Bruce P. Watson (57) ABSTRACT

Disclosed are systems and methods for separating a glass sheet along a predetermined line. Laser beams are generated and shaped into elongated laser beams. Arm members are provided that are pivotally coupled together to form a chain of arm members. Each elongated laser beam is directed therefrom a respective laser beam toward the glass sheet to form a contiguous chain of elongated laser beams thereon a surface of the glass sheet. The arm members can be moved to move the contiguous chain of elongated laser beams along the predetermined line to scoring the glass sheet along the predetermined line.

21 Claims, 7 Drawing Sheets

LASER CUTTING OF GLASS ALONG A PREDETERMINED LINE

PRIORITY

This application claims priority to U.S. Patent Application No. 61/057,549, filed May 30, 2008, titled "Laser-Cutting Of Glass Along A Predetermined Line".

TECHNICAL FIELD

The present invention relates to systems and methods for separating glass sheets along a predetermined line. More specifically, systems and methods are provided for generating a contiguous chain of elongated laser beams and moving the contiguous chain of laser beams along a predetermined line to separate the glass sheet along the line.

BACKGROUND

In the past, several different methods and techniques have been used to cut glass sheets. The most widely used method is mechanical scoring using a wheel made of a hard material and breaking the glass along the score line. The mechanical scribing and breaking process generates debris that collects on the glass surface and requires thorough cleaning. Therefore, glass technology areas that require high glass quality, such as the LCD industry, cannot reliably use mechanical scribing techniques to form glass sheets.

Other widely used methods include the use of lasers to score and/or separate glass sheets. In one technique, a laser beam is used to score the glass; the glass is then separated by mechanical separation techniques. When the laser beam is moved across the glass sheet, it creates a temperature gradient on the surface of the glass sheet, which is enhanced by a coolant (such as a gas or liquid) that follows the laser beam at some distance. Specifically the heating of the glass sheet by the laser and the rapid cooling of the glass sheet by the coolant creates tensile stresses in the glass sheet. The tensile stresses create a crack (or score vent) in the glass surface. In this manner, a score line is created along the glass sheet. The glass sheet can then be separated into two smaller sheets by separating the glass sheet along the score line. Yet another technique uses a first laser beam to score the glass. A second laser beam of a different configuration is used to accomplish laser separation.

Conventional techniques for laser scoring and separating result in limited exposure (or residence) time on the glass sheet provided due to the use of a relatively short laser beam. Slow scoring or separating speeds are needed to achieve the required exposure time of the laser beam on the glass sheet, but result in inefficient glass sheet separations. At high cutting speeds, the exposure time can be insufficient to heat the glass to the required temperature, unless a higher power density beam is used. However, higher power density laser beams can cause overheating of the glass and, as a consequence, create significant residual stress issues in the glass sheet. In order to solve these problems, long, single laser beams have been used, which provide extended residence time and are thus capable of adequately separating glass sheets at a higher scoring or separating speeds. However, due to the elongation of the laser beams necessary to achieve higher speeds, these techniques are limited to linear scoring trajectories.

In order to separate glass sheets along curved trajectories, the single laser beam can be shortened, which brings back the issue of limited residence time and slow cutting speed. Other techniques to achieve separation along non-linear trajectories have required continuous reshaping of the laser beam as it is guided along the non-linear trajectory, which requires high levels of precision and can result in highly complex and potentially inefficient systems.

Thus, there is a need in the art for systems and methods to cut glass sheets along varying trajectories that include linear and/or non-linear portions.

SUMMARY

Systems and methods are provided for separating glass sheets along a predetermined line. More specifically, systems are provided comprising means for generating a plurality of laser beams, a plurality of arm members operatively coupled to each other, and means for shaping the plurality of laser beams to form a plurality of elongated laser beams and directing the elongated laser beams toward the glass sheet. In one aspect, the means for shaping each of the plurality of laser beams is positioned thereon at least two arm members of the plurality of arm members and is spaced from the glass sheet at a predetermined distance. According to a further aspect, the system comprises means for pivotally moving and positioning the plurality of arm members relative to each other to form a contiguous chain of elongated laser beams thereon the glass sheet.

According to yet another aspect, methods are provided for separating a substantially planar glass sheet along a predetermined line. The method, in one aspect, comprises generating a plurality of laser beams and shaping each laser beam of the plurality of laser beams into an elongated laser beam to form a plurality of elongated laser beams. The method can further comprise providing a plurality of arm members operatively coupled together. In yet a further aspect, the method comprises directing each elongated laser beam of the plurality of elongated laser beams from a respective arm members of the plurality of arm members toward the glass sheet to form a contiguous chain of elongated laser beams thereon a surface of the glass sheet, and selectively moving the plurality of arm members to move the contiguous chain of elongated laser beams substantially along the predetermined line to separate the glass sheet substantially along the predetermined line.

Additional aspects of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed and/or as claimed.

BRIEF DESCRIPTION OF THE DRAWINGS

The accompanying drawings, which are incorporated in and constitute a part of this specification illustrate various aspects of the invention and, together with the description, serve to explain the principles of the invention.

DETAILED DESCRIPTION

The following description of the invention is provided as an enabling teaching of the embodiments of invention. To this end, those skilled in the relevant art will recognize and appreciate that many changes can be made to the various embodiments described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "laser beam" includes embodiments having two or more such laser beams unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As briefly summarized above, systems and methods are provided for scoring or separating glass sheets along a predetermined line. It is contemplated that the predetermined line can have any trajectory, such as a substantially linear trajectory, a substantially non-linear trajectory (e.g., curved, arcuate, etc.), or a partially linear and partially non-linear trajectory.

Figure 1:
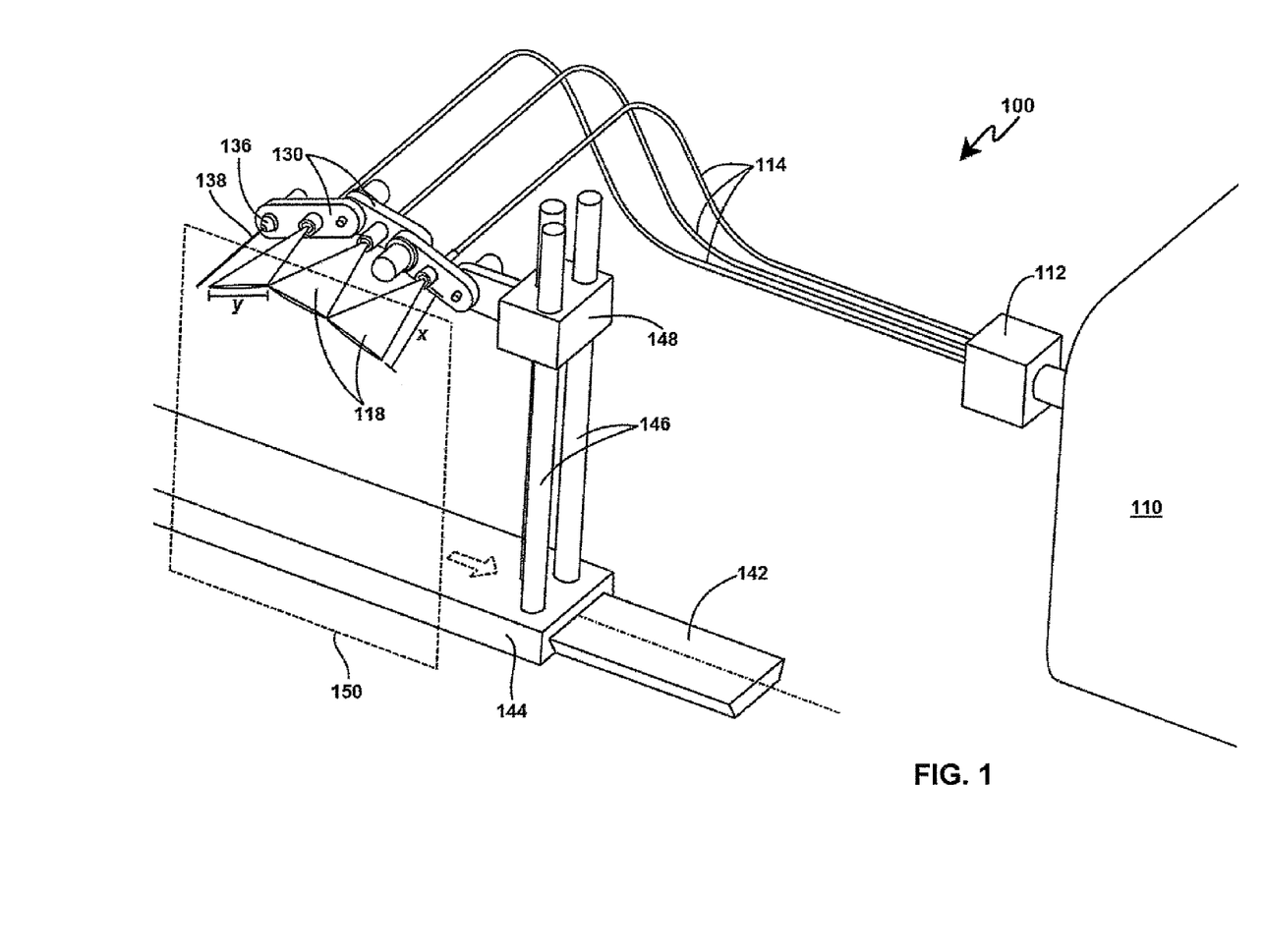
FIG. 1 illustrates an exemplary system for separating glass sheets along a predetermined line.

An exemplary system 100, in one aspect, comprises means for generating a plurality of laser beams. As shown in FIG. 1, the means for generating a plurality of laser beams can comprise a laser 110 configured to generate at least one laser beam, and a beam splitter 112 operatively coupled to the laser. The beam splitter 112 is configured to receive the at least one laser beam from the laser 110 and split the laser beam(s) into a plurality of laser beams. Optionally, two or more lasers can be provided to generate the plurality of laser beams. In this aspect, each of the two or more lasers can be operatively coupled to a respective beam splitter to generate the plurality of laser beams.

Figure 2:
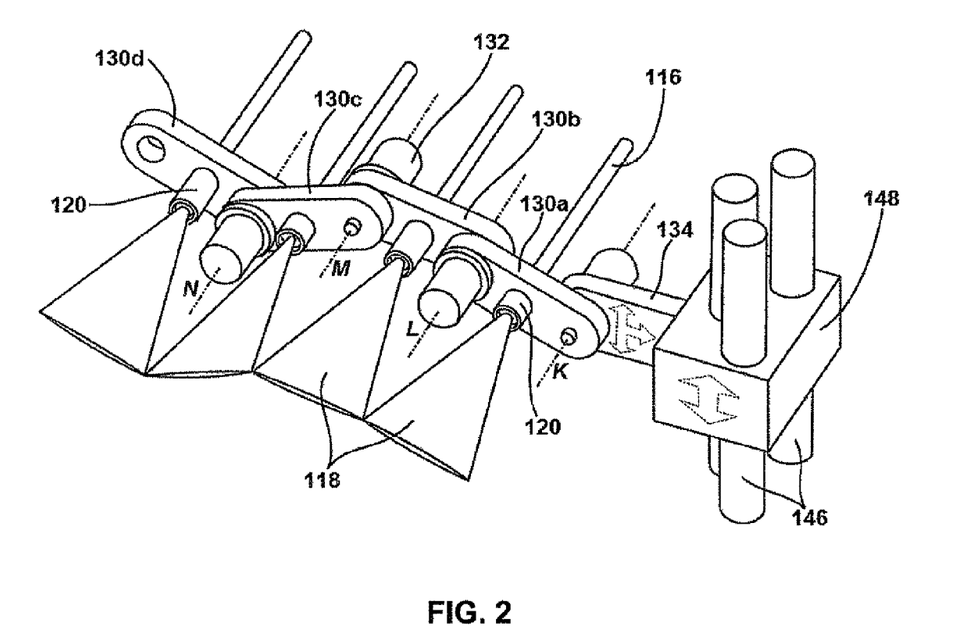
FIG. 2 illustrates a contiguous chain of elongated laser beams generated by the system of FIG. 1.

The system 100, according to a further aspect, comprises a plurality of arm members 130 (for example, as shown in FIG. 2 as 130a, 130b, 130c, 130d). Each arm member 130 has a proximal end portion and an opposing distal end portion. The distal end portion of a first arm member (such as arm member 130a of FIG. 2) can be operatively coupled (such as, but not limited to, pivotally coupled) to the proximal end portion of a second arm member (such as arm member 130b). A coupling zone is defined proximate the distal end portion of the first arm member and the proximal end portion of the second arm member (i.e., proximate the area of operative coupling between the first and second arm members). The distal end portion of the second arm member 130b can be operatively coupled (such as, but not limited to, pivotally coupled) to the proximal end portion of a third arm member (such as arm member 130c), and so on. Thus, it is contemplated that each arm member of the plurality of arm members can be operatively coupled to (such as pivotally coupled to), and moved relative thereto, at least one other arm member to form a chain of arm members. As illustrated in FIG. 2, arm members 130a and 130b can be pivotally connected at axis L, arm members 130b and 130c can be pivotally connected at axis M, and arm members 130c and 130d can be pivotally connected at axis N.

In one aspect, the plurality of arm members comprises from 2 to n arm members. Optionally the plurality of arm members can comprise between about 2 and 20 arm members, between about 2 and 10 arm members, or between about 2 and 5 arm members. However, it is contemplated that any number of arm members can be operatively coupled together depending on the size of the glass sheet to be separated, the trajectory of the predetermined line, the precision needed to separate the glass, the speed at which the glass is to be separated, or other desired system parameters. Thus, the number of arm members that can be used is not meant to be limited to the exemplary ranges described and illustrated herein.

The system 100 can further comprise means for shaping each of the plurality of laser beams to form a plurality of elongated laser beams and directing each of the elongated laser beams toward the glass sheet. In one aspect, the means for shaping each of the plurality of laser beams is positioned thereon at least two arm members of the plurality of arm members. According to a further aspect, the arm members can be positioned relative to the glass sheet such that each of the means for shaping each of the plurality of laser beams can be spaced from the glass sheet 150 at a predetermined distance x, such as shown in FIG. 1. Distance x may be selected such that the length y of the elongated laser beams on the glass sheet is the same as the distance between the coupling zone (such as the pivot point) between the arm members (shown, for example, in FIG. 2 as the distance between adjacent axes L, M, N). In this way, the elongated laser beams will effectively pivotally joined end to end on the glass sheet, forming a contiguous chain of elongated laser beams thereon the glass sheet 150.

As shown in FIG. 2, the means for shaping each of the plurality of laser beams to form a plurality of elongated laser beams can comprise a plurality of beam-shaping optical members 120. Each beam-shaping optical member 120 can be positioned thereon a respective arm member 130 of the plurality of arm members. In one aspect, each beam-shaping optical member can be positioned substantially midway between the proximal and distal end portions of the respective arm member. According to a further aspect, the beam-shaping optical member can be positioned within and extend therethrough a respective arm member, such as shown in FIG. 2.

Figure 3:
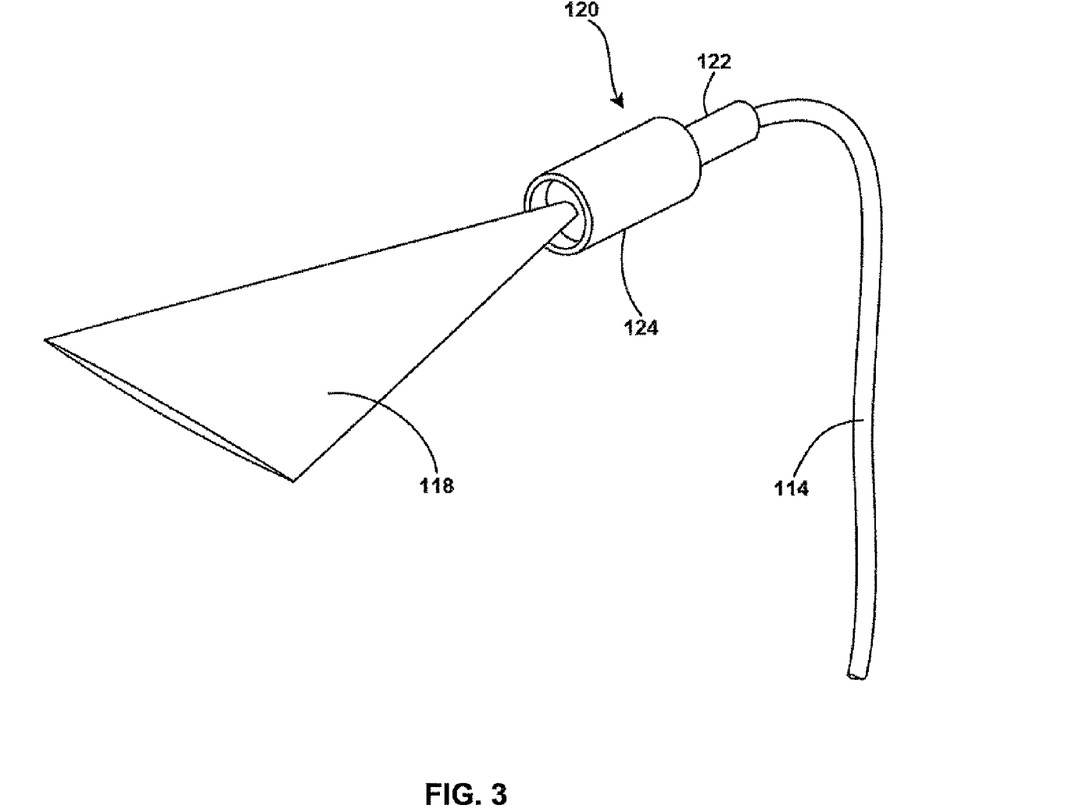
FIG. 3 illustrates an exemplary beam-shaping optical member of the system of FIG. 1.

According to a further aspect, such as shown in FIG. 3, each beam-shaping optical member 120 can comprise a beam collimating optics 122, such as a collimating lens, and at least one cylindrical lens 124 as known in the art for narrowing and elongating laser beams. Laser beam collimating optics/lenses and cylindrical lenses are well known in the art and are not described in detail herein. Any suitable optics for creating an elongated laser beam can be employed.

The system 100 can further comprise a plurality of waveguides 114. Each waveguide can be in communication with the means for generating a plurality of laser beams and a respective means for shaping each of the plurality of laser beams. Each waveguide can guide a respective one of the plurality of laser beams from the means for generating a plurality of laser beams to a respective means for shaping each of the plurality each of the plurality of laser beams. Optionally, other means can be provided for guiding a respective one of the plurality of laser beams from the means for generating a plurality of laser beams to the means for shaping each of the plurality of laser beams, such as, for example, fiber optic cables.

In one aspect, as shown in FIG. 1, each waveguide 114 (of other laser beam guiding means) can be in communication with the beam splitter 112 and one of the beam-shaping optical members 120 and thereby guide one laser beam of the plurality of laser beams from the beam splitter to the respective beam-shaping optical member. Thus, each beam-shaping optical member 120 receives a laser beam from a respective waveguide and directs the laser beam through the collimating lens 122 and the cylindrical lens 124 to generate an elongated laser beam 118, such as shown in FIG. 3.

According to yet another aspect, the system 100 can comprise means for positioning the plurality of arm members relative to each other to form a contiguous chain of elongated laser beams having a desired shape or configuration thereon the glass sheet 150, such as shown in FIG. 1. The means for positioning the plurality of arm members can be positioned proximate the coupling zone. For example, as described above, a coupling zone can be generally defined proximate the area of operative coupling between consecutive arm members in the chain of arm members, such as, for example, at axes L, M, N as shown in FIG. 2. The means for positioning the plurality of arm members, in one aspect, can comprise a plurality of motors 132, each positioned proximate a respective coupling zone. Each motor can be operatively connected to a pivotally joined pair of arm members in order to pivotally drive/position one arm member relative to another arm member. Any suitable pivotal drive connection (not shown) can be employed to operatively connect the motor to the arm members, such as, for example, geared, belt driven, or crank arm and pivot link drive connections. The motors can be, in one aspect, a plurality of stepper motors. Optionally, other electrical or electro-mechanical means can be provided to position the plurality of arm members relative to each other.

As shown in FIG. 2, a motor 132 can be positioned proximate the coupling zone defined between the first arm member 130a and the second arm member 130b. A second motor can be positioned proximate the coupling zone defined between the second arm member 130b and the third arm member 130c, and so on. Each motor can be configured to adjust the angular position between the arm members by pivotally driving one or both of the arm members about the respective axes L, M, N. In one aspect, a processor can be operatively coupled to the means for positioning the plurality of arm members, such as the stepper motors, to position the plurality of arm members relative to each other.

The system 100 can also comprise means for moving the plurality of arm members relative to the glass sheet 150 such that the contiguous chain of elongated laser beams directed thereon the glass sheet substantially follows the predetermined line. According to a further aspect, the means for moving the plurality of arm members is configured to move the plurality of arm members horizontally and vertically substantially parallel to a plane of the glass sheet. For example, as shown in FIG. 1, the means for moving the plurality of arm members can comprise a track 142 having a longitudinal axis (illustrated by the dashed line in FIG. 1), and a platform 144 configured to move along the track in a direction parallel to the longitudinal axis of the track (as indicated by the dashed arrow in FIG. 1). A motor (not shown) can be mounted to one of the platform or track and operatively connected to the other of the platform or track to drive the platform along the track in a controlled manner. Any suitable drive connection, such as for example, geared rack and pinion, friction or belt driven drive connection can be employed to drive and position the platform along the track.

One or more vertical supports 146 can be positioned on the platform 144. As illustrated in FIG. 1, the one or more vertical supports can be positioned proximate an end of the platform, although it is contemplated that the vertical support(s) can be positioned anywhere along the platform. The vertical support (s) 146 can extend upwardly therefrom an upper surface of the platform in a plane substantially parallel to the plane of glass 150 and in a direction substantially perpendicular to the longitudinal axis of the track. A sliding member 148 can be mounted on the vertical support(s) and is configured to slide or otherwise move up and down the supports. The plurality of arms can be connected to the sliding member 148 via connecting means, such as the connecting arm 134 shown FIG. 2. As can be seen, a first arm member 130a can be operatively coupled (such as pivotally coupled) to the connecting arm 134 and a motor or other means can be provided proximate the area of operative coupling to adjust the pivotal position of the first arm member relative to the connecting arm about axis K, in a similar manner as each adjacent pair of arm members are joined. A processor can be operatively coupled to the means for moving the plurality of arm members, such as the stepper motors, to control the relative pivotal movement and position of the arm members with respect to each other and/or adjust the relative X-Y translational movement and position of the chain or arm members, and thus of the contiguous chain of elongated laser beams, relative to the glass sheet 150 to substantially follow the predetermined line on the glass sheet.

According to another aspect, the system comprises means for cooling the glass sheet along the predetermined line downstream of the contiguous chain of elongated laser beams. For example, as shown in FIGS. 1 and 5A-5D, a cooling nozzle 136 can be positioned proximate a distal end of a last arm member in the chain of arm members. As shown in FIG. 1, the cooling nozzle 136 is configured to direct a coolant fluid 138, such as cool air or water, at the glass sheet proximate the last elongated laser beam in the contiguous chain of elongated laser beams.

Methods are provided according to the present invention for separating a substantially planar glass sheet along a predetermined line. The method, in one aspect, comprises generating a plurality of laser beams and shaping each laser beam into an elongated laser beam to form a plurality of elongated laser beams. For example, as shown in FIG. 1, a laser 110 can be provided to generate an initial laser beam, which is passed to a beam splitter 112, which in turn splits the initial beam into the plurality of laser beams. Each of the plurality of laser beams can be passed, via a waveguide 114 or fiber optic cable for example, to a respective beam-shaping optical member 120 that is configured to form each laser beam into an elongated laser beam.

The method can further comprise providing a plurality of arm members, each arm member having a proximal end portion and an opposing distal end portion. A respective distal end portion of a first arm member can be pivotally coupled to a respective proximal end portion of a second arm member, such as described above. In one aspect, the method further comprises directing each elongated laser beam of the plurality of elongated laser beams from a respective arm member of the plurality of arm members toward the glass sheet to form a contiguous chain of elongated laser beams thereon the glass sheet. For example, as shown in FIG. 1, a respective elongated laser beam can be directed from a beam-shaping optical member positioned on an arm member of the plurality of arm members. The glass sheet can be selectively spaced from the arm members such that the contiguous chain of elongated laser beams is formed thereon the glass sheet. In a further aspect, each elongated laser beam can be directed toward the glass along a respective axis that is substantially perpendicular to a plane of the glass sheet.

The method can further comprise selectively positioning and moving the plurality of arm members to move the contiguous chain of elongated laser beams substantially along the predetermined line to separate the glass sheet substantially along the predetermined line. Selectively positioning and moving the plurality of arm members can comprise moving the arm members horizontally and/or vertically substantially parallel to a plane of the glass sheet. Optionally, the plurality of arm members can be selectively positioned and pivoted relative to each other, while being selectively positioned and moved relative to the glass sheet in the horizontal and/or vertical directions described above, in order to move the contiguous chain of elongated laser beams substantially along a predetermined curved line on the glass and score of the glass. The curved line may have a continuous curvature, or a curvature that varies along the line.

Figure 4:
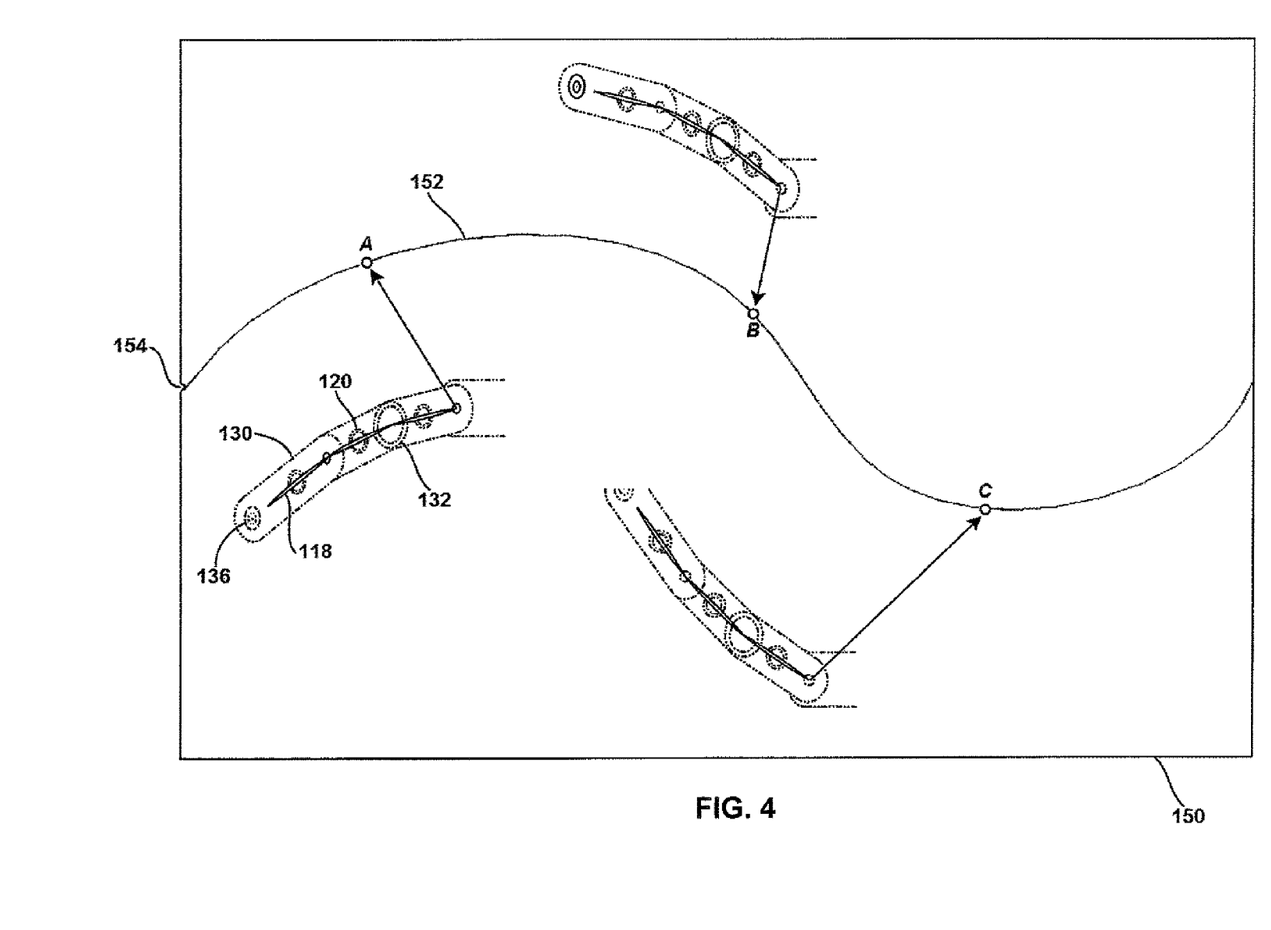
FIG. 4 illustrates the relative positioning of elongated laser beams within a contiguous chain of elongated laser beams as the chain is moved along a predetermined line.
Figure 5A:
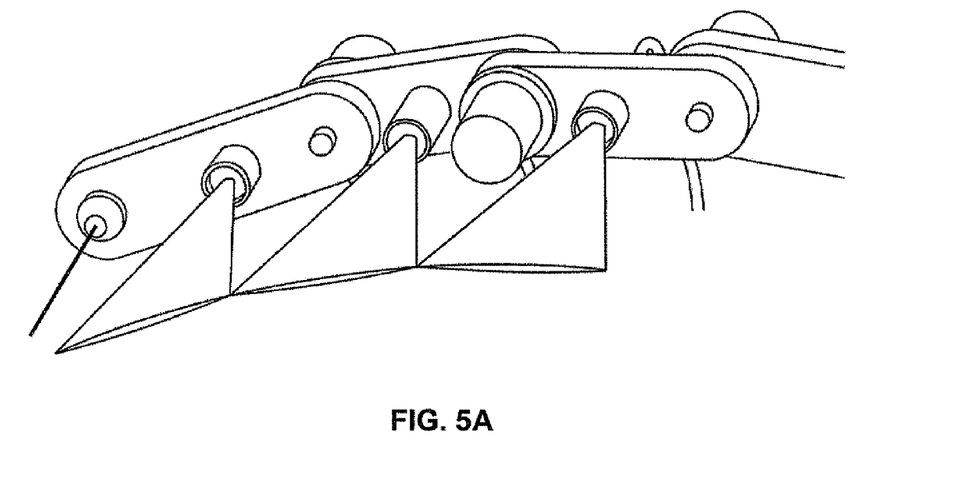
FIGS. 5A-5D illustrate exemplary positions of a plurality of arm members of the system of FIG. 1.
Figure 5B:
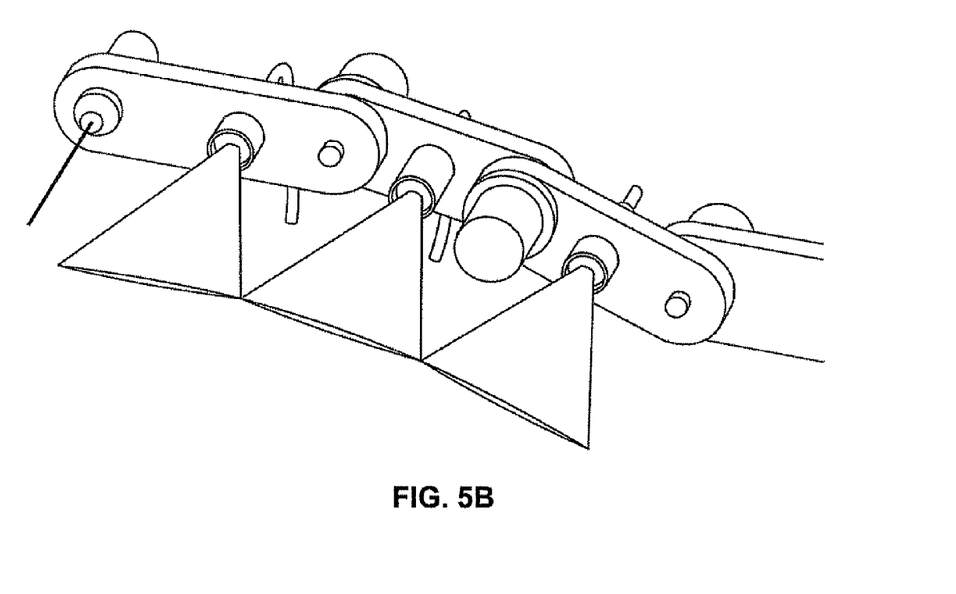
Figure 5C:
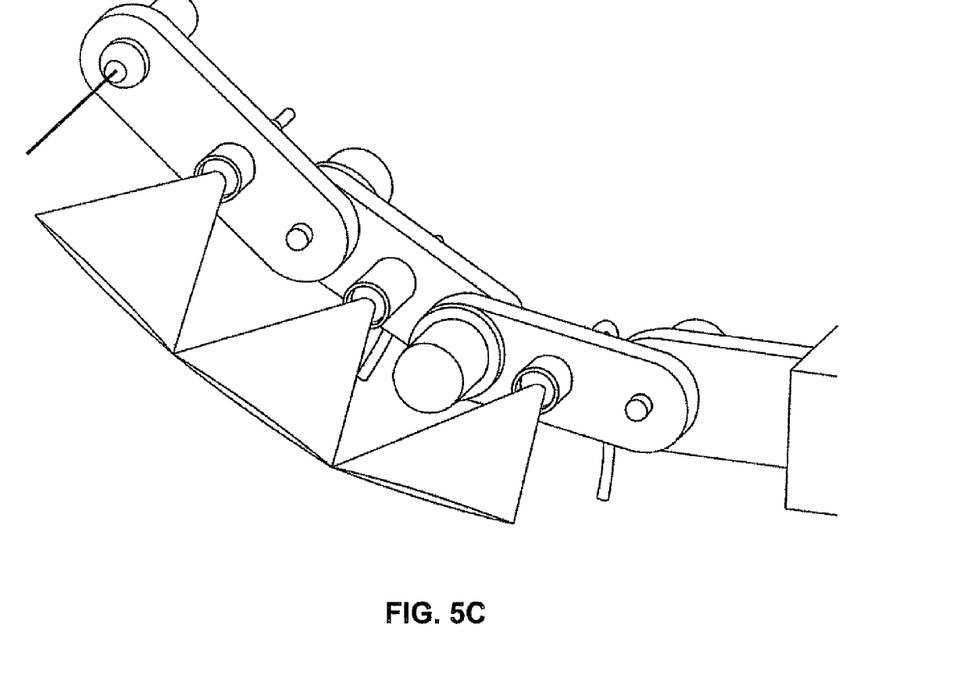
Figure 5D:
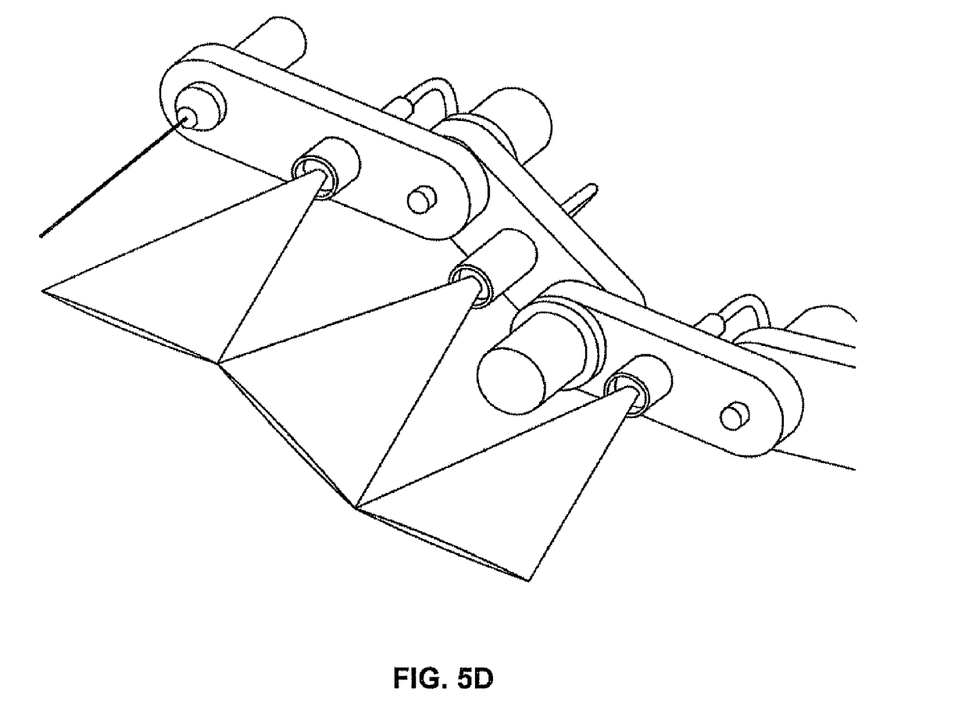

For example, as illustrated in FIG. 4, the plurality of arm members can be selectively moved to move the contiguous chain of elongated laser beams along the predetermined line 152. In one aspect, the glass sheet can be nicked or scribed at an edge of the glass sheet to initiate the score line, in any well known manner (such as diagrammatically indicated by 154 in FIG. 4). In this aspect, the plurality of arm members can be initially positioned such that the first elongated laser beam in the contiguous chain of elongated laser beams contacts the glass sheet proximate the nicked edge portion. The arm members can then be selectively moved so that the contiguous chain of elongated laser beams substantially follows the predetermined line. Thus, the arm members can be moved to and through an initial position "A". As the plurality of arm members are moved horizontally and vertically to move the contiguous chain of elongated laser beams from point A to and through point B, the position of the arm members relative to each other can be simultaneously adjusted. Likewise, the plurality of arm members can be moved horizontally and vertically and the relative position between each arm member can be adjusted to move the contiguous chain of elongated laser beams from point B to and through point C. In this manner, it is contemplated that the glass sheet can be separated along a predetermined line having a broad range of trajectories and/or curvatures. The change in the relative position of the arm members is also exemplified in FIGS. 5A through 5D.

As can be seen in FIGS. 4 and 5A-5D, as the contiguous chain of elongated laser beams is moved along the predetermined line, the shape of each elongated laser beam is maintained. The contiguity of the chain of elongated laser beams is also maintained. The contiguity of the chain of elongated laser beams and the elongation of the laser beams results in the heat generated by the laser being distributed over an extended length of the predetermined line, which in turn results in efficient and rapid heating of the glass along the line without ablation or melting of the glass, while using relatively low laser power density.

The method can further comprise directing a coolant at the glass sheet substantially along the predetermined line downstream of the contiguous chain of elongated laser beams. As described, a cooling nozzle may be provided thereon an arm member of the plurality of arm members. The cooling nozzle can be configured to direct the coolant at the glass sheet therefrom the arm member.

As described above, it is contemplated that systems and methods described herein can be used to separate a glass sheet along a predetermined line having any shape or trajectory and including both linear and non-linear (or curved) portions. The radius of curvature of a curved portion of the score line can be adjusted, for example, by adjusting the relative pivotal position of the arm members. It will be appreciated, however, that the radius of curvature of the resulting contiguous chain of elongated laser beams will have a lower limit based upon the length of the individual arm members and the resulting length of the individual elongated laser beams. If a smaller radius of curvature is desired, the length of the individual arm members can be shortened and/or the distance x between the arm members (and thus the beam-shaping optical members) and the glass sheet can be adjusted to correspondingly reduce the length of the elongated laser beams on the glass sheet. In yet another aspect, a portion of the score line can be substantially linear and the relative positions of the arm members can be adjusted such that the elongated laser beams are substantially collinear.

In another aspect, the systems and methods of the present invention can be described in the general context of computer instructions, such as program modules being executed by a computer. Generally, program modules comprise routines, programs, objects, components, data structures, etc. that perform particular tasks or implement particular abstract data types. The systems and methods described herein can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via an automated manufacturing process. It is well understood in the art how to set up and operate automated computer/processor-controlled manufacturing equipment. As such, the details of such automated equipment and its setup and operation are not described in detail herein.

Lastly, it should be understood that while the present invention has been described in detail with respect to certain illustrative and specific embodiments thereof, it should not be considered limited to such, as numerous modifications are possible without departing from the broad spirit and scope of the present invention as defined in the appended claims.

The invention claimed is:

1. A system for scoring a substantially planar glass sheet along a curved line, comprising:
 a plurality of arm members, wherein each arm member has a proximal end and an opposing distal end, wherein a respective distal end of a first arm member of the plurality of arm members is pivotally coupled to a respective proximal end of a second arm member of the plurality of arm members;
 means for generating a plurality of laser beams and guiding a respective one of the plurality of laser beams to each of at least two adjacent arm members of the plurality of arm members;
 a means for shaping a respective one of the delivered laser beams into an elongated laser beam and directing the elongated laser beam toward the glass sheet, wherein a respective means for shaping and directing a respective one of the delivered laser beams is positioned on each of the at least two adjacent arm members of the plurality of arm members and is spaced from the glass sheet at a distance to form a contiguous chain of elongated laser beams on the glass sheet; and means for pivotally moving and positioning the plurality of arm members relative to each other to form the contiguous chain of elongated laser beams on the glass sheet into an approximation of at least a portion of a predetermined curved line.

2. The system of claim 1, wherein the means for generating a plurality of laser beams comprises a laser configured to generate at least one laser beam and a beam splitter operatively coupled to the laser and configured to receive the at least one laser beam and split the at least one laser beam into the plurality of laser beams.

3. The system of claim 1, further comprising means for moving the plurality of arm members relative to the glass sheet such that the contiguous chain of elongated laser beams directed thereon the glass sheet substantially follows further portions of the predetermined curved line.

4. The system of claim 3, wherein the means for moving the plurality of arm members relative to the glass sheet is configured to move the plurality of arm members horizontally and vertically substantially parallel to a plane of the glass sheet.

5. The system of claim 1, wherein the plurality of arm members comprises between about 2 and 20 arm members.

6. The system of claim 1, wherein the plurality of arm members comprises between about 2 and 10 arm members.

7. The system of claim 1, further comprising a means for cooling the glass sheet along the predetermined line downstream of the contiguous chain of elongated laser beams.

8. The system of claim 1, wherein each of the means for shaping and directing a respective one of the delivered laser beams comprises a beam-shaping optical member.

9. The system of claim 8, wherein each of the beam-shaping optical members comprises a collimating lens and a cylindrical lens, wherein the collimating lens and the cylindrical lens are substantially coaxially aligned.

10. The system of claim 9, further comprising a plurality of waveguides, each waveguide being in communication with the means for generating a plurality of laser beams and a respective one of the means for shaping and directing a laser beam, wherein each waveguide of the plurality of waveguides guides a respective one of the plurality of laser beams.

11. The system of claim 10, wherein each waveguide of the plurality of waveguides is in communication with the means for generating a plurality of laser beams and a respective beam-shaping optical member of the plurality of beam-shaping optical members, and wherein each beam-shaping optical member is configured to receive a respective laser beam through the collimating lens and the at least one cylindrical lens to generate an elongated laser beam of the plurality of elongated laser beams.

12. The system of claim 1, further comprising a processor operatively coupled to the means for pivotally moving and positioning the plurality of arm members.

13. A method for scorning a substantially planar glass sheet along a curving line, comprising:

providing a plurality of arm members, wherein each arm member has a proximal end and an opposing distal end, wherein a respective distal end of a first arm member of the plurality of arm members is pivotally coupled to a respective proximal end of a second arm member of the plurality of arm members;

generating a plurality of laser beams;

shaping each laser beam of the plurality of laser beams into an elongated laser beam to form a plurality of elongated laser beams;

directing each elongated laser beam of the plurality of elongated laser beams from a respective arm member of the plurality of arm members toward the glass sheet to form a contiguous chain of elongated laser beams on a surface of the glass sheet; and selectively moving the plurality of arm members and pivoting the plurality of arm members relative teach other to move the contiguous chain of elongated laser beams substantially along the predetermined line to score the glass sheet substantially along the curving line.

14. The method of claim 13, wherein selectively moving the plurality of arm members comprises moving the plurality of arm members horizontally and vertically substantially parallel to a plane of the glass sheet.

15. The method of claim 14, wherein selectively moving the plurality of arm members comprises selectively pivotally positioning the arm members relative to each other.

16. The method of claim 13, wherein generating a plurality of laser beams comprises generating an initial laser beam and splitting the initial laser beam into the plurality of laser beams.

17. The method of claim 13, further comprising directing a coolant at the glass sheet proximate a distal portion of a last elongated laser beam of the contiguous chain of elongated laser beams.

18. The method of claim 17, wherein directing a coolant at the glass sheet substantially along the predetermined line downstream of the contiguous chain of elongated laser beams.

19. The method of claim 13, further comprising maintaining a shape of each elongated laser beam of the plurality of laser beams.

20. The method of claim 13, wherein directing each elongated laser beam toward the glass sheet comprises directing each elongated laser beam along a respective axis substantially perpendicular to a plane of the glass sheet.

21. The method of claim 13, wherein shaping each laser beam into an elongated laser beam comprises passing each laser beam through a collimating lens and a cylindrical lens to form the elongated laser beam.

* * * * *